Aug. 11, 1970 E. I. PEZIRTZOGLOU 3,524,017

RECORD AMPLIFIER-DRIVER FOR CONTINUOUSLY DRIVING ANALOG RECORDER HEADS WITH AN OPTIMUM RECORD CURRRENT DURING THE LIFE OF THE HEAD

Filed March 23, 1966 2 Sheets-Sheet 1

EVANGELOS I. PEZIRTZOGLOU
INVENTOR.

BY Robert G. Clay

ATTORNEY

RECORD AMPLIFIER-DRIVER FOR CONTINUOUSLY DRIVING ANALOG RECORDER HEADS WITH AN OPTIMUM RECORD CURRRENT DURING THE LIFE OF THE HEAD

Filed March 23, 1966 2 Sheets-Sheet 2

EVANGELOS I. PEZIRTZOGLOU
INVENTOR

BY Robert G. Clay
ATTORNEY

United States Patent Office
3,524,017
Patented Aug. 11, 1970

3,524,017
RECORD AMPLIFIER-DRIVER FOR CONTINUOUSLY DRIVING ANALOG RECORDER HEADS WITH AN OPTIMUM RECORD CURRENT DURING THE LIFE OF THE HEAD

Evangelos I. Pezirtzoglou, Mountain View, Calif., assignor to Ampex Corporation, Redwood City, Calif., a corporation of California Filed Mar. 23, 1966, Ser. No. 536,699
Int. Cl. H04n 5/78
U.S. Cl. 178—6.6 9 Claims

ABSTRACT OF THE DISCLOSURE

Method and apparatus for driving analog recorder heads, wherein the input from a conventional frequency modulator is applied to a non-linear record amplifier which, in turn, provides a low impedance output signal. This signal is introduced to a special network via a coaxial cable, and thence to a rotary transformer circuit and the associated recorder head. The special network is adapted to compensate for the imaginary part of the complex impedence of the recorder head and its associated circuitry, whereby the head and circuitry behaves as a frequency independent impedance over the useful range of frequencies. The head driving current is thus essentially a square wave whose amplitude is selected to provide the optimum playback output throughout the life of the head.

The present invention relates generally to record amplifier-driver circuits for videotape recorders and more particularly to a method of and apparatus for driving video and instrumentation analog recorder heads with a modulated square wave current input.

Existing record amplifier-driver circuits for videotape recorders generally provide a sine wave current waveform to drive the associated conventional magnetic heads. In such sine wave drivers, as the pole tips of the heads wear down during use the head efficiency increases, because the depth of the head gap decreases and accordingly an increase in playback output results, and a readjustment of the record currents becomes necessary from time to time. In an unattended recorder such a condition is obviously not practical. In addition, in the sine wave type of record amplifier-drivers, second harmonic distortion is introduced during the record mode due to external direct current fields, resulting in inefficient operation. That is, in such a circuit the sine wave output is passed through a linear amplifier, which is held to an efficiency of less than 25% to prevent the introduction of the second harmonic and distortion caused thereby.

The present invention overcomes the above-noted shortcomings by providing a method of, and apparatus for, introducing a square wave current signal to a video or an instrumentation analog recorder head, which signal is modulated in accordance with the information history.

Accordingly, it is an object of the invention to provide a method of driving a video or an instrumentation analog recorder head with a modulated square wave driving current wherein no readjustment of the record current is necessary during the life of the head.

It is another object of the present invention to provide a video or an instrumentation analog recorder amplifier-driver circuit wherein second harmonic distortion due to external direct current fields is eliminated thereby allowing operation of the circuit at relatively higher efficiencies than heretofore possible with conventional circuits.

It is another object of the present invention to provide a method and apparatus for driving a video or an instrumentation analog recorder head which does not require a high voltage power supply and which is relatively efficient and reliable for unattended applications.

Additional object and advantages will be apparent from the specification taken in conjunction with the drawings in which.

Figure 1:
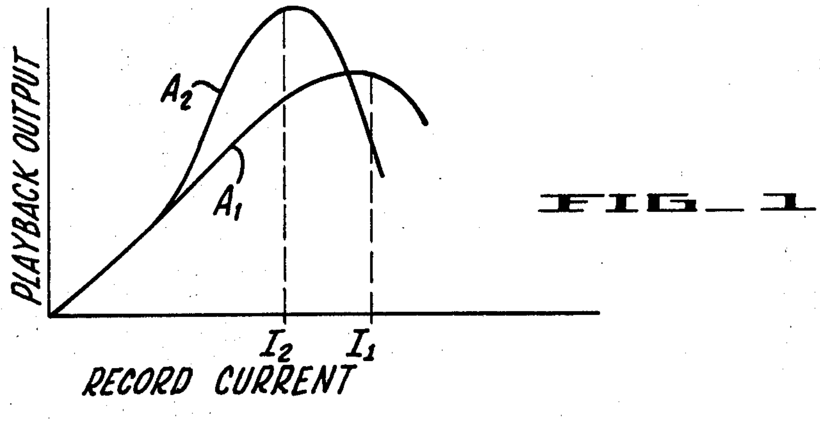
FIGS. 1 and 2 show a graphical representation of the playback output as a function of the record current, for a conventional sine wave driver, and a square wave driver of the invention, respectively.
Figure 2:
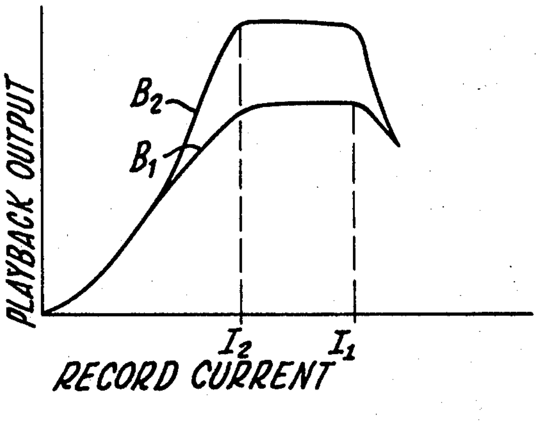

Referring to FIGS. 1 and 2, a comparison is made between the playback output-versus-record current characteristics of a head driven by a sine wave driver and a square wave driver, respectively, during the life of a magnetic head. In FIG. 1 curves $A_1$ and $A_2$ define the characteristics for a sine wave driver at the beginning and end respectively of head life. It may be seen, that as the head wears the optimum record current setting shifts from the original value at $I_1$ to a value equal to that shown as $I_2$. Accordingly, as the head wears and the efficiency thereof improves, due to the decrease of headspacing and the increase in playback output, the record current value applied thereto must be readjusted to obtain maximum head and driver circuit efficiency.

Referring to FIG. 2 there are shown characteristic curves for a square wave driver in accordance with the invention, wherein curves $B_1$ and $B_2$ define the characteristics at the beginning and end respectively, of head life. As the head wears and the efficiency thereof improves, the record current values will shift from $I_1$ to $I_2$. However, in this case no readjustment of the record current is necessary since at all times during the head life the playback output remains at the optimum value regardless of the inherent shifting of the record current value. Thus, in accordance with the invention the record current optimization for optimum playback output is not a critical factor, which is an important consideration when utilizing a recorder for unattended applications.

Figure 3:
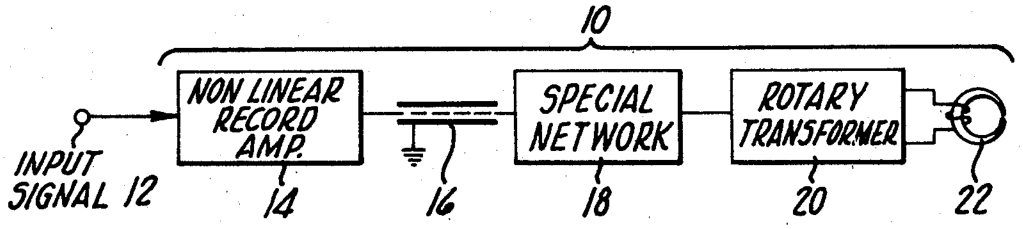
FIG. 3 is a block diagram exemplifying the apparatus of the present invention.

FIG. 3 is a block diagram exemplifying apparatus which may be employed in performing the method of the invention. More particularly, an input signal from the output of a conventional frequency modulator is applied via input terminal 12 to a non-linear record amplifier 14. The record amplifier 14 is essentially a paraphase amplifier with a current source connected to the emitters thereof, as further described hereinafter. The output from the record amplifier 14 is introduced to a coaxial cable 16 and from thence to a special network 18. The special network 18 drives a rotary transformer circuit 20 which transfers the energy to a recording head 22 coupled thereto. The function of the special network is to compensate for the imaginary part of the complex impedance of the recording head 22 and associated circuitry connected thereto, whereby the network-head combination as shown in FIG. 3 behaves as a non-frequency dependent impedance over the entire useful range of frequencies. The special network 18 provides this compensation by introducing a function which is the complementary function of the complex impedance of both the head 22 and the rotary transformer 20, thereby compensating for the imaginary part of the complex impedance circuitry. Thus, the resulting current through the head 22 to drive the head, due to the elimination of the reactive component of the head-transformer combination, is essentially a square wave of selected magnitude which exhibits the advantages of previous mention in accordance with the invention.

The function for the special network 18 is obtained for example, by measuring the complex impedance of the head 22 and the rotary transformer 20 at the input to the rotary transformer 20. The curve for the measured complex impedance is then plotted versus frequency, and the complement of the curve is obtained, i.e. the complementary curve required which in combination with the plotted curve, will give a linear function. Then a circuit, such as the special network 18, is realised which provides the complementary function and which accordingly compensates for the imaginary part of the measured complex impedance.

Figure 4:
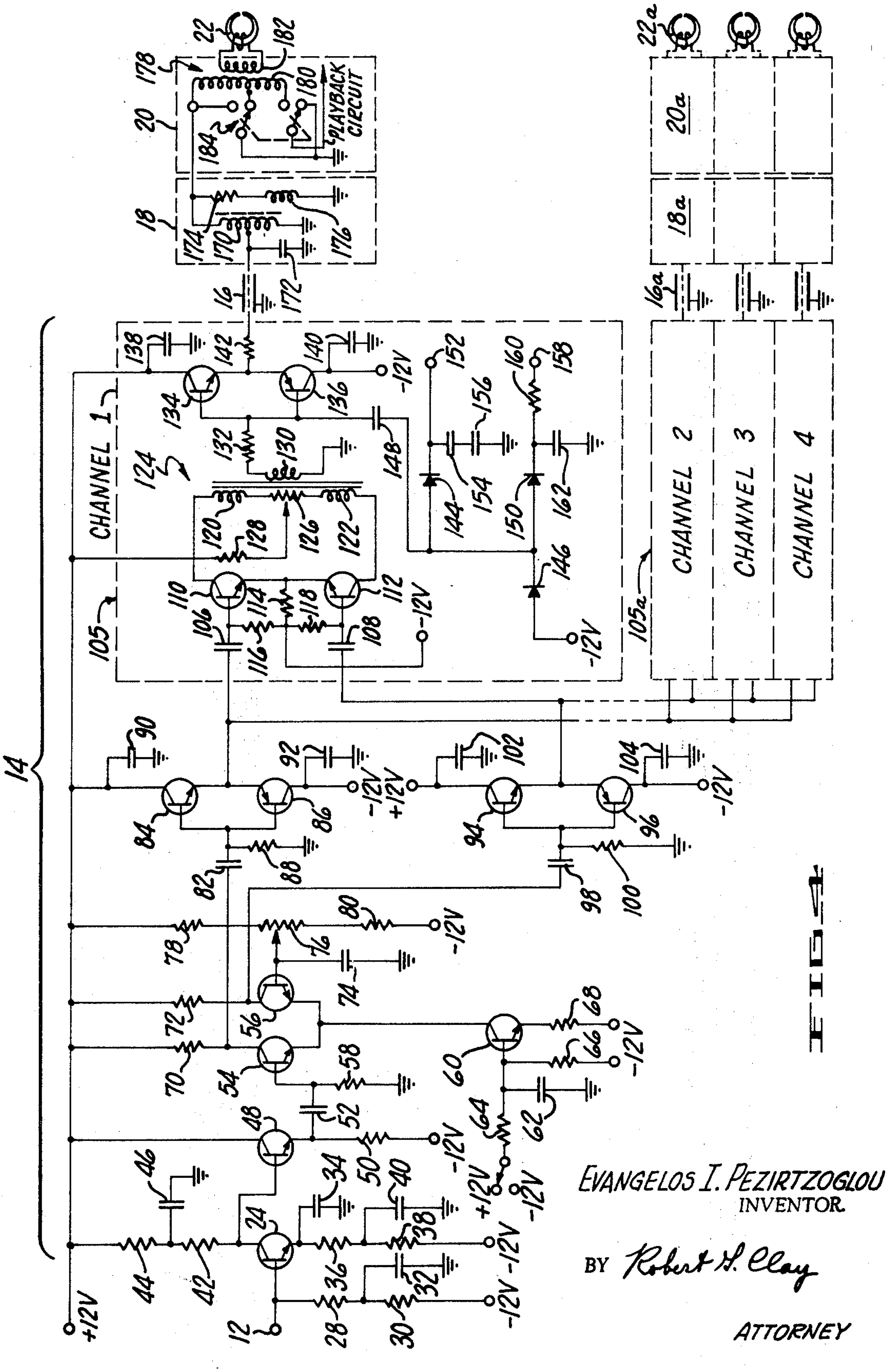
FIG. 4 is a schematic diagram exemplifying in greater detail circuits of the apparatus shown in FIG. 3.

Referring now to FIG. 4 there is shown in greater detail each of the various circuits of the square wave record amplifier-driver apparatus of FIG. 3. The input signal from a conventional FM modulator is applied via terminal 12 to the record amplifier 14, through the coaxial cable 16, the special network 18, to the rotary transformer 20 and from thence to the head 22.

Regarding the record amplifier 14 of previous mention, input terminal 12 is coupled to the base of a transistor 24, which forms a wideband amplifier stage. In addition, the base is connected to a negative 12 volt source through serially connected resistors 28 and 30, with the junction therebetween coupled in turn to ground via capacitor 32. The emitter of transistor 24 is coupled to ground via a capacitor 34, and is further connected to the negative 12 volt source by means of serial resistors 36 and 38. The junction of resistors 36 and 38 is coupled to ground via capacitor 40. The collector terminal of transistor 24 is connected to a posiitve 12 volt source through serial resistors 42 and 44, with the junction therebetween connected to ground via a capacitor 46. The output from the transistor 24 amplifier stage is taken from the collector thereof and is introduced to the base of a transistor 48 which forms an emitter follower stage for isolating the amplifier output from the following stage, while providing a low impedance output. The collector of transistor 48 is connected to the positive 12 volt source and the emitter is connected to the negative 12 volt source through a resistor 50. A low impedance output signal is provided from transistor 48 via a coupling capacitor 52 connected between the emitter electrode thereof and the base of a first transistor 54 of a pair of transistors 54, 56 which form a paraphase amplifier circuit. The base of transistor 54 is connected to ground via resistor 58, and the emitters of the transistors 54, 56 are connected together and from thence to the collector of a transistor 60 which controls the operation of the paraphase amplifier. That is, transistor 60 is cut off when the driver is in the playback mode and provides a bias level to the transistors 54, 56 when the driver is in the record mode. The base of transistor 60 is connected to ground through a capacitor 62, and through a resistor 64, to either the positive or the negative 12 volt source, when switched to the record or playback positions respectively. The base and emitter electrodes of transistor 60 are connected via resistors 66 and 68 respectively to the negative 12 volt source.

The collector electrodes of transistors 54, 56 are connected to a positive 12 volt source by means of resistors 70 and 72 respectively, and the base of transistor 56 is coupled to ground through capacitor 74, and also to the slider terminal of a variable resistor 76. Variable resistor 76 is connected at either end to the positive 12 volt source and the negative 12 volt source through resistors 78 and 80 respectively in order to course adjust the second harmonic distortion for all four channels hereinafter described.

The paraphase amplifier circuit of transistors 54, 56 provides a pair of outputs at the respective collectors thereof which comprise two output signals 180° out of phase with one another. The output from transistor 54, which represents the positive excursion of the pulse, is fed through a coupling capacitor 82 to the common connection between the bases of a pair of complementary transistors 84 and 86 which form an isolating stage of high input and low output impedance. The common junction between the bases is coupled to ground through a resistor 88. The collectors of transistors 84, 86 are connected to positive and negative 12 volt sources respectively, and also to ground via capacitors 90 and 92 respectively. The emitters of transistors 84, 86 are connected together and provide therefrom the low output impedance signal.

The output from transistor 56 which represents the negative excursion of the pulse fed to the paraphase amplifier circuit is introduced to another similar isolating stage formed of transistors 94 and 96. The circuit is identical to that hereinbefore described with respect to transistors 84, 86 and utilizes capacitor 98, resistor 100 and capacitors 102 and 104. An output from the transistors 94, 96 is provided from commonly connected emitters thereof and represents, in a positive sense, the negative excursion of the original pulse.

The two outputs from the two similar isolating stages are introduced via coupling capacitors 106, 108 respectively to transistors 110 and 112 of a set-reset switch circuit of a channel 1 general switch circuit, designated herein as 105. The bases of the transistors 110, 112 are coupled to the respective capacitors 106, 108 while the emitters thereof are connected together. The junction of the emitters is connected to the negative 12 volt source through a resistor 114, and the bases of the transistors are also connected to the negative 12 volt source through resistors 116, 118 respectively. Double primary windings 120 and 122 of a transformer 124 are connected in series with a variable resistor 126, and thence between the collector electrodes of the transistors 110 and 112. The slider terminal of the variable resistor 126 is connected to the positive 12 volt source through a resistor 128. The variable resistor 126 provides a fine adjustment for second harmonic distortion in individual channel 1. A secondary winding 130 of the transformer 124 is grounded at one end thereof and is connected at its other end through a resistor 132 to the bases of a pair of complementary transistors 134 and 136. The transistors 134, 136 form an isolating stage similar to those hereinabove described, wherein the collectors thereof likewise are connected to the positive and negative 12 volt sources respectively, as well as to ground through respective capacitors 138, 140. The commonly connected emitter electrodes are connected through a resistor 142 to the coaxial cable 16 of previous mention, wherein the output from the isolating stage is of very low impedance matching that of the coaxial cable 16.

A double diode circuit formed of diodes 144 and 146 provides means for variable, but symmetrical, clipping of the output from the set-reset switch circuit, which is introduced to the coaxial cable 16. Diodes 144 and 146 are connected together at their anode and cathode respectively, and thence to the junction of the bases of the transistors 134, 136 via a capacitor 148. The anode of diode 146 is connected to the negative 12 volt source. The cathode of diode 144 is connected to a record level control (not shown) via a terminal 152, as well as to ground via serially connected capacitors 154, 156. As may be seen, the voltage level applied to terminal 152 determines the record level, i.e., the current amplitude applied to the head. The record current is thus preset via terminal 152 and diodes 144, 146 to provide the optimum playback output in accordance with the invention and as depicted in FIG. 2. Visual record indication is provided to a suitable meter device (not shown via a terminal 158 connected to a cathode of a diode 150, via a resistor 160, and from thence to the junction between diodes 144, 146. The cathode of diode 150 is also connected to ground through a capacitor 162. Diode 150 rectifies the waveform and provides a direct current output representative thereof, to the meter device.

Regarding now the special network 18 of previous mention, the coaxial cable 16 is connected at its free end to a tap of a toroidal ferrite core transformer 170 and also to ground through a capacitor 172. One end of the transformer 170 is connected to ground while the other end is connected to a resistor 174. The transformer 170 can have for example, 7 turns with 3 turns between the tap and the ground connection. The resistor 174 in turn is connected at its other end to ground through a coil 176. The junction between the transformer 170 and the resistor 174 provides the output from the special network, which is introduced to the rotary transformer 20 of previous mention. As previously mentioned the special network 18 eliminates the imaginary part of the complex impedance at the circuit-head impedance.

The rotary transformer 20 comprises, inter alia, a transformer 178 having a tapped primary winding 180 and a secondary winding 182. The secondary winding is connected to the head 22 of previous mention. One end of the primary winding 180 is connected to the junction between the transformer 170 and the resistor 174, to receive the output from the special network 18, while the other end of the winding is connected to a normally open contact of a switch 184. The tap is coupled via another contact of the switch 184 to ground. Switch 184 provides means for switching from the record mode (as shown), to a playback mode. When in the playback mode, a playback circuit (not shown) is connected to the primary winding of transformer 178 and thus to the head 22, whereby signals sensed by the head during the reproduce mode are processed. The primary winding 180 may comprise for example, 12 turns with 7 turns between the tap and the junction between transformer 170 and resistor 174.

Since the individual stages of the apparatus of FIG. 4 exemplifying the method of the invention are generally of straightforward operation the step-by-step operation need not be described herein. However, in general, input signals from the frequency modulator circuit (not shown) are introduced to the wideband amplifier transistor 24, and from thence to the isolating transistor 48, providing therefrom a low impedance output. The output is introduced to the paraphase amplifier consisting of transistors 54, 56 which respectively sense both the rising and falling sides of the incoming pulse. The two resulting outputs from the paraphase amplifier are fed to respective isolating circuits, and from thence to the inputs of the four channels indicated in FIG. 4 and described in detail with reference to channel 1 only. It is to be understood that although only the general switch circuit 105 of channel 1 is herein described, 3 additional channels of circuitry similar to that of channel 1 are connected to the two outputs from the isolating stages as shown in phantom line in the FIG. 4. A channel 2 general switch circuit **105*a* is connected to a coaxial cable 16*a*, to special network 18*a*, to rotary transformer 20*a*, and from thence to a head 22*a*, as heretofore described for channel 1. Channels 2 and 3** are similar.

The general switch circuit 105 converts to two outputs into a single, square wave voltage output signal which is introduced to the isolating, high input-low output impedance stage consisting of transistors 134 and 136. The low output impedance of the latter transistors is matched to that of the coaxial cable 16, whereupon the square wave voltage signals are introduced through the special network, to the rotary transformer 20, whereby square wave current drives the record head 22 in accordance with the invention. That is, unlike digital input tape recording heads, the leading and trailing edges of the square wave current waveform are modulated (shifted with respect to time) to represent the modulated input signals which represent in turn the information history.

Although the present invention has been described in conjunction with specific circuits as shown in FIG. 4, it is to be understood that various circuits capable of performing the same functions may be substituted therefor. Accordingly, it is not intended to limit the scope of the invention except as defined in the following claims.

What is claimed is:

1. An improved method for driving video and instrumentation analog recorder heads having an energizing winding and associated rotary transformer circuitry, the head and circuitry having a complex impedance, wherein the head is driven in accordance with information to be recorded, wherein the generation of second harmonic distortion is eliminated and the necessity of adjusting the record current introduced to the head during the life thereof is precluded, comprising the steps of:

determining the complementary function of the complex impedance of the head and associated circuitry;

applying a current of square waveform modified in accordance with the reciprocal of the complementary function to the energizing winding of the head, said head defining thereby a frequency independent impedance, said square waves being of selected amplitude and of substantially symmetrical waveform, wherein the leading and trailing edges of the applied square waveform are modulated in accordance with the input signal;

determining the optimum record current setting relative to the optimum playback output for the beginning and end of head life; and initially driving the head with the respective optimum record current determined for the beginning of head life, to provide head operation at the end of head life at the respective optimum record current determined for the end of head life.

2. The method of claim 1 further comprising the steps of, forming a square wave of desired amplitude and rise time modulated in accordance with the input signal, and modifying the formed square wave to provide a square wave driving current to the head, said head defining thereby the frequency independent impedance.

3. The method of claim 2 further comprising the steps of, measuring the combined complex impedance of the head and associated circuitry, and compensating for the imaginary part of the combined complex impedance to provide said head square wave driving current.

4. A square wave record amplifier for driving video and instrumentation analog recorder heads with their associated circuitry in response to a frequency modulated input signal, wherein the necessity of periodically adjusting the record current introduced to the head during the life thereof is precluded, the heads and associated circuitry having a combined complex impedance, comprising;

record amplifier means coupled to receive the input signal, said record amplifier means providing a short rise time low impedance output signal of selected amplitude, said record amplifier means including means for providing a pair of anti-phase output signals, means for combining the pair of anti-phase signals to provide the low impedance output signal, and means for setting the record current level and thus the amplitude of the low impedance output signal to a predetermined value;

special network means coupled to said record amplifier means to receive the low impedance output signal therefrom and compensate for the imaginary part of the complex impedance of the head and associated circuitry, wherein the head and associated circuitry behaves as a frequency independent impedance; and rotary transformer means connected between the special network means and the head to introduce the compensated output signal to the head.

5. The apparatus of claim 4 wherein the record amplifier means further comprises;

amplifier means coupled to the frequency modulated input signal for receiving the output therefrom and providing a first low impedance output signal;

paraphase stage means defining said means for providing, coupled to said amplifier means and adapted to provide a pair of low impedance outputs 180° out-of-phase in response to the first low impedance output signal;

at least one channel of set-reset switch means defining said means for combining, coupled to said paraphase stage means for combining the two low impedance 180° out-of-phase outputs and provide at least one respective channel of said low impedance output signal having a pre-selected magnitude and symmetrical square waveform; and said special network means is coupled between said set-reset means and said rotary transformer means to modify the low impedance symmetrical square waveform output signal which is introduced to the head, wherein the head and the special network means behaves as the frequency independent impedance.

6. The apparatus of claim 5 wherein the special network means further comprises a selected circuit to provide a complementary function which compensates for the imaginary part of the combined complex impedance.

7. The apparatus of claim 6 wherein the 180° out-of-phase outputs of said paraphase stage means represent the leading and trailing edges respectively of the first low impedance output signal from the amplifier means.

8. The apparatus of claim 7 wherein the set-reset switch means further comprises diode means coupled thereto for symmetrically and variably clipping the combined 180° out-of-phase signals to provide said square wave of pre-selected amplitude.

9. The apparatus of claim 8 wherein said set-reset switch means further comprises essentially a push-pull circuit adapted to combine the 180° out-of-phase signals from said paraphase stage means.

References Cited

UNITED STATES PATENTS

| | | | |
|---|---|---|---|
| 2,480,052 | 8/1949 | Schenkel | 333—28 |
| 3,280,270 | 10/1966 | Allington. | |
| 3,377,436 | 4/1968 | Maxey. | |

FOREIGN PATENTS

| | | |
|---|---|---|
| 840,001 | 7/1960 | Great Britain. |

ROBERT L. GRIFFIN, Primary Examiner

D. E. STOUT, Assistant Examiner

U.S. Cl. X.R.

179—100.2